US009118198B2

(12) United States Patent
Naskali et al.

(10) Patent No.: US 9,118,198 B2
(45) Date of Patent: Aug. 25, 2015

(54) BALANCING OF BATTERY CELLS CONNECTED IN PARALLEL (71) Applicant: Nokia Corporation, Espoo (FI)

(72) Inventors: Matti J. Naskali, Tokyo (JP); Rune Lindholm, Sottunga (FI); Heikki Sakari Paananen, Saku (JP); Frank Borngraber, Weissenhorn (DE)

(73) Assignee: Nokia Technologies Oy, Espoo (FI)

( * ) Notice: Subject to any disclaimer, the term of this patent is extended or adjusted under 35 U.S.C. 154(b) by 325 days.

(21) Appl. No.: 13/722,137

(22) Filed: Dec. 20, 2012

(65) Prior Publication Data
US 2014/0176045 A1    Jun. 26, 2014

(51) Int. Cl.
*H02J 7/00* (2006.01)
*H01M 10/44* (2006.01)
*H01M 10/42* (2006.01)

(52) U.S. Cl.
CPC ............. *H02J 7/0054* (2013.01); *H01M 10/44* (2013.01); *H01M 10/441* (2013.01); *H02J 7/007* (2013.01); *H02J 7/0013* (2013.01); *H01M 2010/4271* (2013.01); *H02J 7/0014* (2013.01)

(58) Field of Classification Search
None
See application file for complete search history.

(56) References Cited

U.S. PATENT DOCUMENTS

| 5,811,890 | A * | 9/1998 | Hamamoto | 307/66 |
|---|---|---|---|---|
| 6,285,161 | B1 | 9/2001 | Popescu | 320/118 |
| 6,750,631 | B2 * | 6/2004 | Perelle | 320/116 |
| 8,098,048 | B2 * | 1/2012 | Hoff | 320/120 |
| 8,143,851 | B2 * | 3/2012 | Greening et al. | 320/116 |
| 8,598,847 | B2 * | 12/2013 | Eberhard et al. | 320/126 |
| 8,798,832 | B2 * | 8/2014 | Kawahara et al. | 701/22 |
| 2009/0027006 | A1 | 1/2009 | Vessini et al. | 320/118 |
| 2009/0208824 | A1 * | 8/2009 | Greening et al. | 429/91 |
| 2009/0243540 | A1 * | 10/2009 | Choi et al. | 320/107 |
| 2010/0164430 | A1 | 7/2010 | Lu et al. | 320/103 |
| 2011/0003182 | A1 * | 1/2011 | Zhu | 429/50 |
| 2011/0260779 | A1 * | 10/2011 | Liu | 327/520 |
| 2012/0043929 | A1 * | 2/2012 | Yazami | 320/107 |

(Continued)

FOREIGN PATENT DOCUMENTS

CN    102293626 A    9/2011
EP    1 221 734 A2    7/2002
EP    2 416 468 A2    2/2012

(Continued)

OTHER PUBLICATIONS

"Active balancing circuit for advanced lithium-ion batteries used in photovoltaic applications", J. F. Reynaud et al., International Conference on Renewable Energies and Power Quality, Apr. 2010, 6 pgs.

(Continued)

*Primary Examiner* — Leigh Garbowski
(74) *Attorney, Agent, or Firm* — Harrington & Smith (57) ABSTRACT Systems and techniques for parallel battery balancing are described. A battery assembly comprises a first battery interface and a second battery interface; the first battery interface may connect to a first battery exhibiting a first voltage profile and the second battery interface may connect to a second battery exhibiting a second voltage profile. The battery assembly further comprises a current flow control mechanism to direct current flow to, from, and between the first battery and the second battery, with current directed to each battery being adapted so as to be compatible with the voltage profile of the battery.

16 Claims, 7 Drawing Sheets (56) References Cited

U.S. PATENT DOCUMENTS

2012/0194133 A1    8/2012   Posamentier ................. 320/116
2012/0313439 A1*  12/2012   Yamaguchi et al. ............ 307/71

FOREIGN PATENT DOCUMENTS

| JP | 2010220404 A | 9/2010 |
| JP | 2011105293 A | 6/2011 |
| KR | 20120016993 A | 3/2012 |
| KR | 20120065293 A | 6/2012 |
| WO | WO-02/23664 A1 | 3/2002 |
| WO | WO-2011/070517 A1 | 6/2011 |
| WO | WO-2012/040496 A1 | 3/2012 |

OTHER PUBLICATIONS

"New Li-Ion Battery Management Chipset ATA6870, ATA6871 for Electrical and Hybrid Vehicles", Claus Mochel, Atmel Automotive Compilation, vol. 6, 4 pgs.
"Cell Balancing Maximizes the Capacity of Multi-Cell Li-Ion Battery Packs", Carlos Martinez, Intersil, Inc., 5 pgs.
"Active Cell Balancing Methods for Li-Ion Battery Management ICs using the ATA6870", ATMEL, Application Note, 2010, 9 pgs.
"Lithium-Ion Continuous Cell Balancing Overview", SWE, 17 pgs.
"Battery Cell Balancing: What to Balance and How", Yevgen Barsukov, 7 pgs.
"Nexelion", Sony make.believe, http://www.sony.co.jp/SonyInfor/News/Press/201107/11-078/; Oct. 31, 2012, 3 pgs.

* cited by examiner

| FIG.5A |
| FIG.5B | FIG.5

FIG.6

BALANCING OF BATTERY CELLS CONNECTED IN PARALLEL

TECHNICAL FIELD

The present invention relates generally to linkage of multiple battery cells. More particularly, the invention relates to improved systems and techniques for balancing battery cells connected in parallel.

BACKGROUND

With the introduction of portable wireless devices that have substantial capabilities and are heavily used, more attention has been paid to the potential benefits provided by longer-lasting, more powerful and versatile batteries and battery assemblies. One approach to achieving such improved batteries and battery assemblies is to use multiple battery cells.

SUMMARY

In one embodiment of the invention, an apparatus comprises a first battery interface, a second battery interface connected in parallel to the first battery interface, and energy storage between the first battery interface and the second battery interface. The apparatus further comprises a current flow control mechanism for controlling current flow to at least one of the first battery interface, the second battery interface, and the energy storage, wherein the at least one of the switching mechanism and the energy storage are configured to provide a voltage adapted to a battery connected to the battery interface to which the current flow is directed, wherein a battery connected to the first battery interface exhibits a different voltage than does a battery connected to the second battery interface.

In another embodiment of the invention, a mobile device comprises a first battery interface and a second battery interface connected in parallel to the first battery interface. The mobile device further comprises a current flow control mechanism for controlling current flow to at least one of the first battery interface and the second battery interface, wherein controlling current flow to and from the at least one of the first battery interface and the second battery interface is based at least in part on comparison between a voltage at the interface and a reference voltage value, wherein controlling the current flow comprises adjusting current flowing to the first battery interface so as to be compatible with a voltage profile exhibited at the first battery interface and adjusting current flowing to the second battery interface so as to be compatible with a voltage profile exhibited at the second battery interface.

In another embodiment of the invention, a method comprises, for each of a first battery interface and a second battery interface connected in parallel in a battery assembly, comparing a voltage against a reference value and, based on the comparison between the voltage and the reference value, controlling current flow to and from each battery interface based on a comparison of the voltage and the reference value. Controlling the current flow comprises adjusting the current flowing to the second battery interface so as to be compatible with a voltage profile exhibited at the first battery interface and adjusting the current flowing to the first battery interface so as to be compatible with a voltage profile exhibited at the second battery interface.

In another embodiment of the invention, a method comprises, for each of a first battery and a second battery connected in parallel in a battery assembly, comparing a battery voltage against a reference value and, based on the comparison between the battery voltage and the reference value, controlling current flow to and from each battery based on a comparison of the battery voltage and the reference value. Controlling the current flow comprises adjusting the current flowing to the second battery so as to be compatible with a voltage profile of the first battery and adjusting the current flowing to the first battery so as to be compatible with a voltage profile of the second battery.

In another embodiment of the invention, an apparatus comprises means for comparing a battery voltage against a reference value for each of a first and a second battery interface connected in parallel in a battery assembly and means for controlling current flow to and from each battery interface based on a comparison of a battery voltage and the reference value. Controlling the current flow comprises adjusting the current flowing to the first battery interface so as to be compatible with a voltage profile exhibited at the second battery interface and adjusting the current flowing to the second battery interface so as to be compatible with a voltage profile exhibited at the first battery interface.

DETAILED DESCRIPTION

Embodiments of the present invention recognize that one approach to achieving a desired battery capacity and other characteristics has been the connection of multiple cells in parallel. With a parallel connection, an assembly of cells performs similarly to a single cell with an equivalent total electrode area, but the use of an assembly provides for flexibility in physically arranging the cells and also avoids the use of a larger cell which might be more costly to manufacture, and therefore to purchase, than an equivalent group of cells.

For assemblies consisting of multiple instances of the same cell, or of cells with the same characteristics, such connections are easily accomplished. However, the contemplated uses of electrical and electronic devices continue to increase, and the importance of supplying sufficient power associated with these uses also increases. Many usage scenarios have been contemplated in which a device might benefit from the parallel use of multiple cells, including the parallel use of multiple cells having different characteristics.

One or more embodiments of the present invention recognize that while parallel connection of batteries of the same technology or chemistry is widely known and used, the use of different technologies or chemistries frequently presents voltage imbalances that impair or prevent successful use in a parallel connection. Embodiments of the invention further recognize that the benefits that may be afforded through parallel connection of cell having different chemistries or technologies. For example, one cell may provide higher power and another cell may provide higher energy, and a parallel connection of such cells would provide a combination of the maximized total power and maximized total energy of the cells. Other benefits may be achieved, such as providing a voltage matched to the high energy cell and to a chipset of the device. Embodiments of the present invention provide mechanisms to achieve these and other benefits by transferring charge between cells connected in parallel, and also recognize that the usefulness of such mechanisms is not limited to the use of different battery chemistries or technologies. For example, parallel connection using charge transfer mechanisms may provide a "hot swap" feature. Such a "hot swap feature provides the ability to remove and replace a discharged or partially discharged battery of a parallel connected battery package without powering down a device, because power is provided by a different battery of the package while the discharged battery is being removed and replaced. A user may, for example, benefit from the "hot swap" feature for example when making a call, listening to music or watching a video, or any time he or she wished to replace a battery without interrupting the use of a device being powered by the battery.

Therefore, in one or more embodiments, the invention provides for mechanisms to transfer charge between cells, allowing cells having differing characteristics to be discharged and charged in parallel. One or more embodiments of the invention provide for a bidirectional buck/boost converter. In exemplary implementations, multiple cells may be configured so that peak power is provided by a stronger, higher rate cell or set of cells, while the load is connected. A predefined pulse width in a switch mode power supply may provide predetermined coupling between cells to maintain both at an optimized charge level. Charge levels may, for example, be optimized so that a higher power cell is maintained in full charge until a higher energy batter has been mostly discharged. In another exemplary implementation, coupling may be predetermined so that two different discharging voltage curves are followed to maintain equal charge levels at different voltages.

Figure 1:
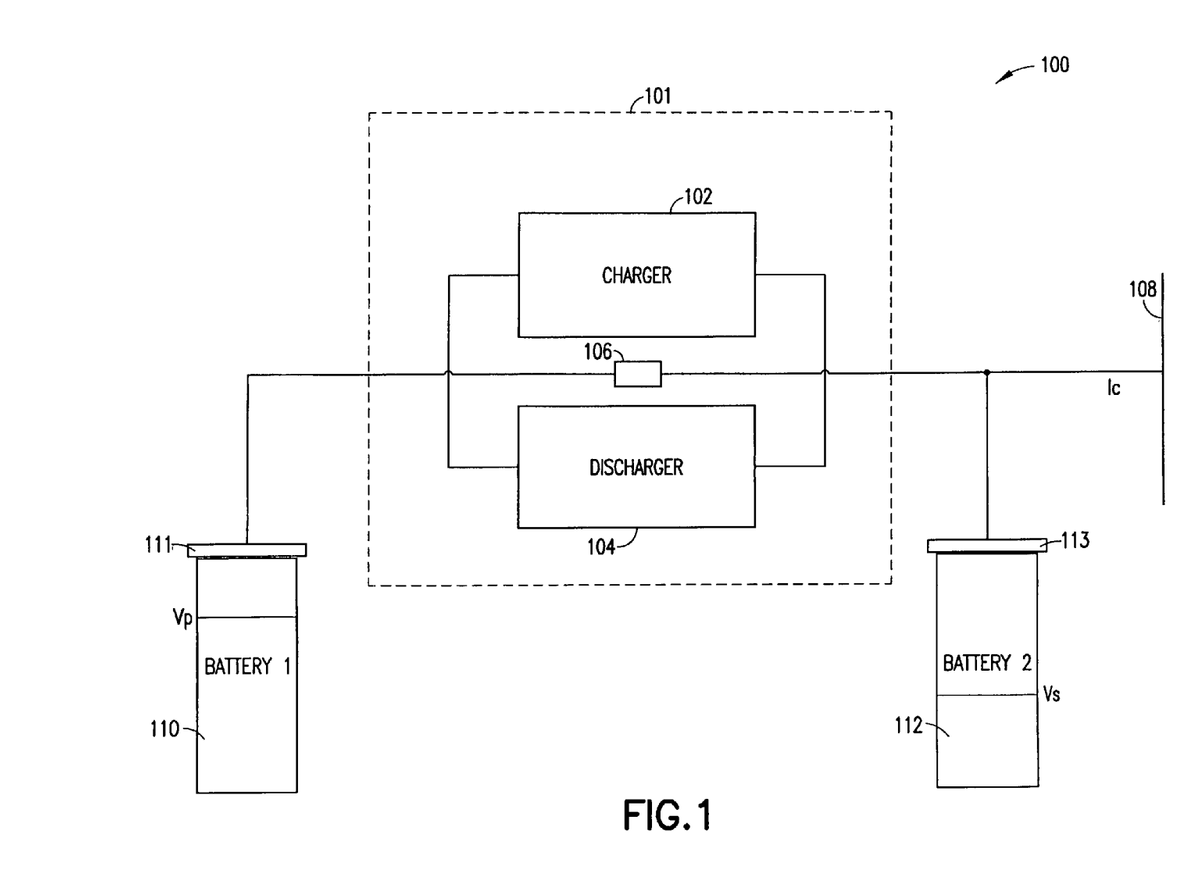
FIG. 1 illustrates a battery assembly according to an embodiment of the present invention.

FIG. 1 illustrates a simplified block diagram of a battery assembly 100 comprising a switch mode power supply (SMPS) 101 according to an embodiment of the present invention. The SMPS 101 comprises a charger 102, a discharger 104, and a sensing and control element 106. The SMPS 101 connects to a device interface 108 of an electronic device, which may, for example, be a wireless communication device. The wireless communication device's battery assembly 100 may be charged with a device charger. The device charger may be a USB charger, a wireless charger, conventional AC adapter charger, or a solar charger, as an example. The device charger may be coupled or otherwise connected to the device interface 108 to provide charge to the battery assembly 100. The sensing and control element 106 controls the operations of the charger 102 and discharger 104 depending on the relative voltages of a first battery 110, connected to a first battery interface 111 and a second battery 112, connected to a second battery interface 113, as well as the direction of current flow between the SMPS 101 and the device interface 108. For example, the first battery may be a slower charging, higher capacity battery, and the second battery may be a faster charging, lower capacity battery.

Values taken into account in controlling the direction of charge and discharge are:

$V_p$: Voltage at the first battery 110
$V_s$: Voltage at the second battery 112
$V_{stop}$: Target voltage, below which charging of first battery stops
$V_{pmin}$: Minimum voltage at first battery 110
$V_{smin}$: Minimum voltage at second battery 112
$I_c$: Current flow between assembly 100 and device interface 108

The battery assembly 100 operates in one or more of a number of different modes depending on the absolute and relative values of various voltages, currents, voltage parameters, and current parameters such as those listed above.

Figure 2:
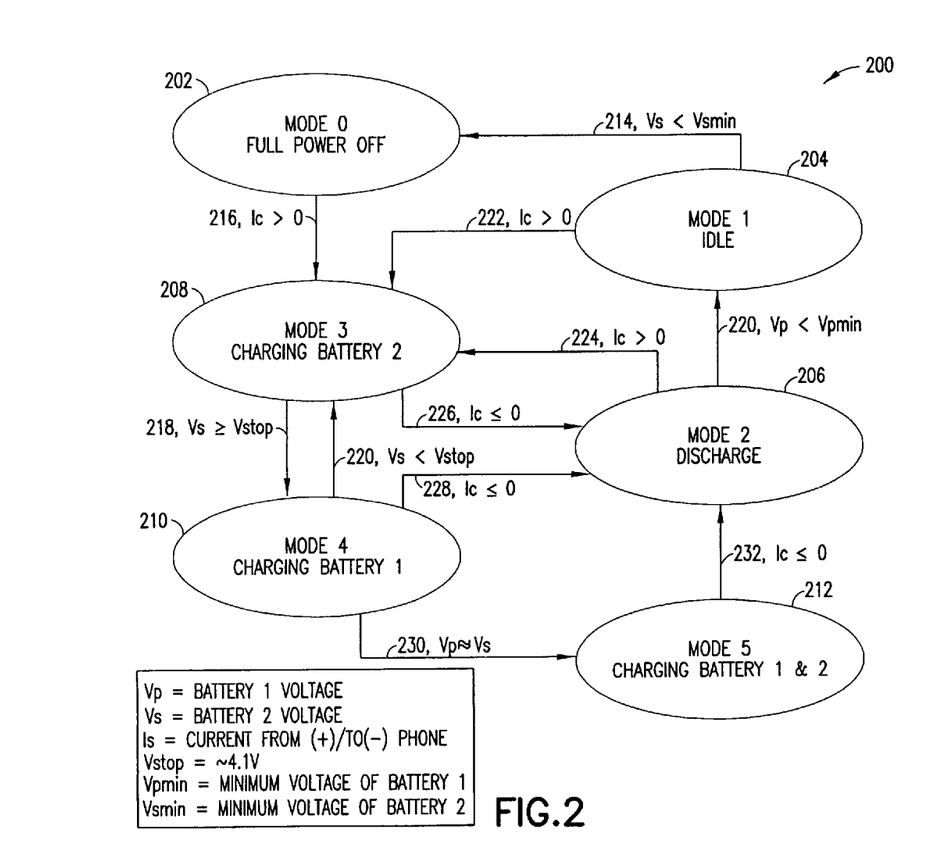
FIG. 2 illustrates a state transition diagram according to an embodiment of the present invention.

A battery assembly such as the assembly 100 may suitably operate so as to maintain appropriate voltage profiles at the batteries or battery interfaces. A voltage profile may be, for example, a voltage level or a voltage range. A voltage profile may also comprise a voltage curve—that is, a change in voltage level over time. In one or more embodiments of the invention, the assembly operates to allow for compatibility between voltage profiles appearing at the interfaces, suitably by managing current flows between the interfaces 111 and 113, the charger 102, and the discharger 104, so that appropriate voltage levels appear at the interfaces 111 and 113. Compatibility between voltage profiles includes factors such as voltage levels at interfaces that avoid excessive differences, maintaining levels within an acceptable range over time, avoiding a level at one interface that will cause an excessive charge or discharge rate for a battery at another interface, and similar factors. FIG. 2 illustrates a diagram 200 showing different operating modes for a battery assembly such as the assembly 100. In the case of the assembly 100, the sensing and control element 106 may place the assembly 100 in the correct mode by operating the charger 102 and the discharger 104 to achieve the correct operation for the mode. The operating modes may include a full power off mode 202, an idle mode 204, and a discharge mode 206, as well as a second battery charging mode 208, a first battery charging mode 210, and a first and second battery charging mode 212. The full power off mode 202 is entered in a transition 214 from the idle mode 204, when $V_s < V_{smin}$. When current is flowing into the battery assembly 100, that is, when $I_c > 0$, the assembly 100 leaves the full power off mode 202 by making a transition 216 to the second battery charging mode. The second battery is a faster charge, lower capacity battery, so its charging may begin first.

Once the second battery voltage is no longer below the minimum needed for charging the first battery, that is, when $V_s \geq V_{stop}$, the assembly 100 makes a transition 218 to the first battery charging mode 210. The assembly 100 may transition between charging the first battery and charging the second battery depending on the level of $V_s$ relative to $V_{stop}$, making the transition back to the second battery charging mode 208 when $V_s < V_{stop}$.

The second battery charging mode may also be entered in a transition 222 from the idle mode 204, or a transition 224 from the discharge mode 206, with each transition occurring when $I_c > 0$. On the other hand, if the current begins flowing from the assembly 100 toward the device interface 108, the assembly 100 will make a transition 226 from the second battery charging mode 208 to the discharge mode 206, or a transition 228 from the first battery charging mode 210 to the discharge mode 206.

If the first battery voltage becomes equal or substantially equal to the second battery voltage, that is, if $V_p \sim V_s$, the assembly 100 makes a transition 230 from the first battery charging mode 210 to the both batteries charging mode 212. If the current begins to flow toward the device interface 108 while the assembly 100 is in the both batteries charging mode 212, the assembly 100 undergoes a transition 232 to the discharge mode 212. Changes in modes may be achieved by adjustments of current, such as adjustment of current voltage levels or current directions, as well as rates of current flow.

Figure 3:
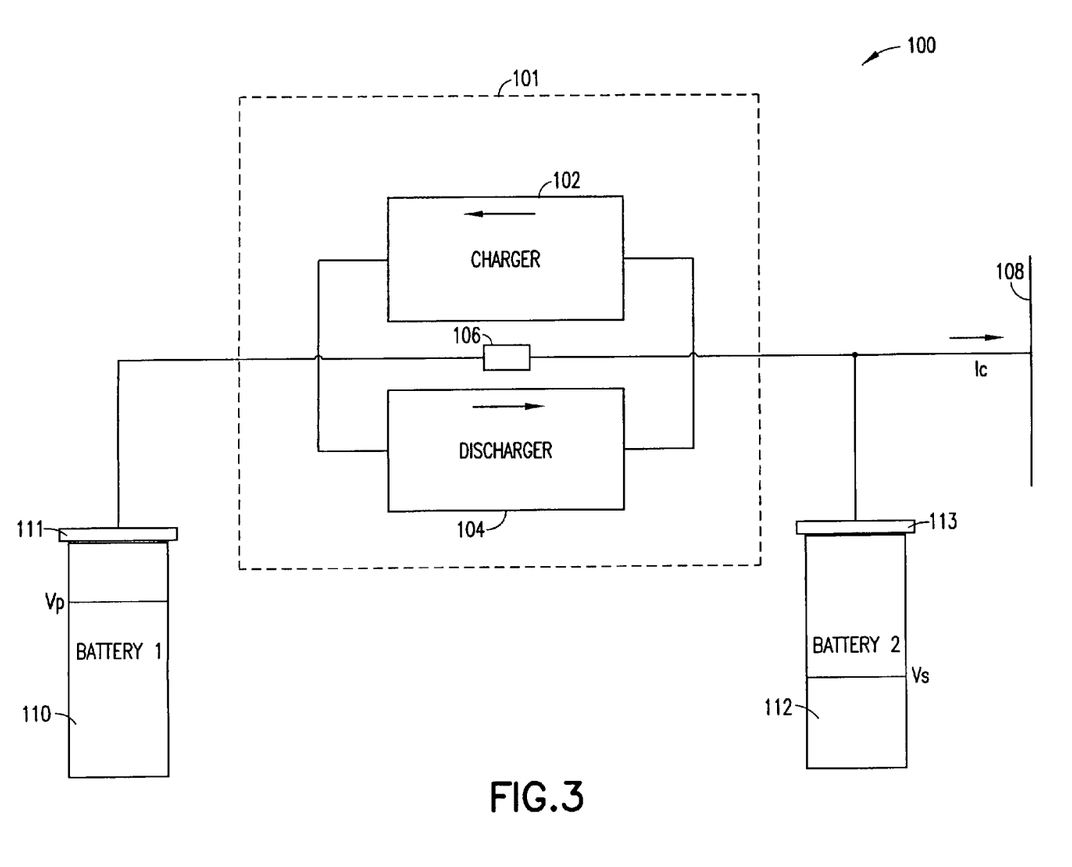
FIGS. 3-5 illustrate battery assemblies according to an embodiment of the present invention.

FIG. 3 illustrates the assembly 100 in the discharge mode 206, showing current flow directions within the assembly 100, that is, from the charger 102 and discharger 104, and from the assembly 100 to the device interface 108. Current is flowing to the device interface 108, so that $I_c \leq 0$, and the discharger 102 is directing current from the first battery 110 to the second battery 112.

Figure 4:
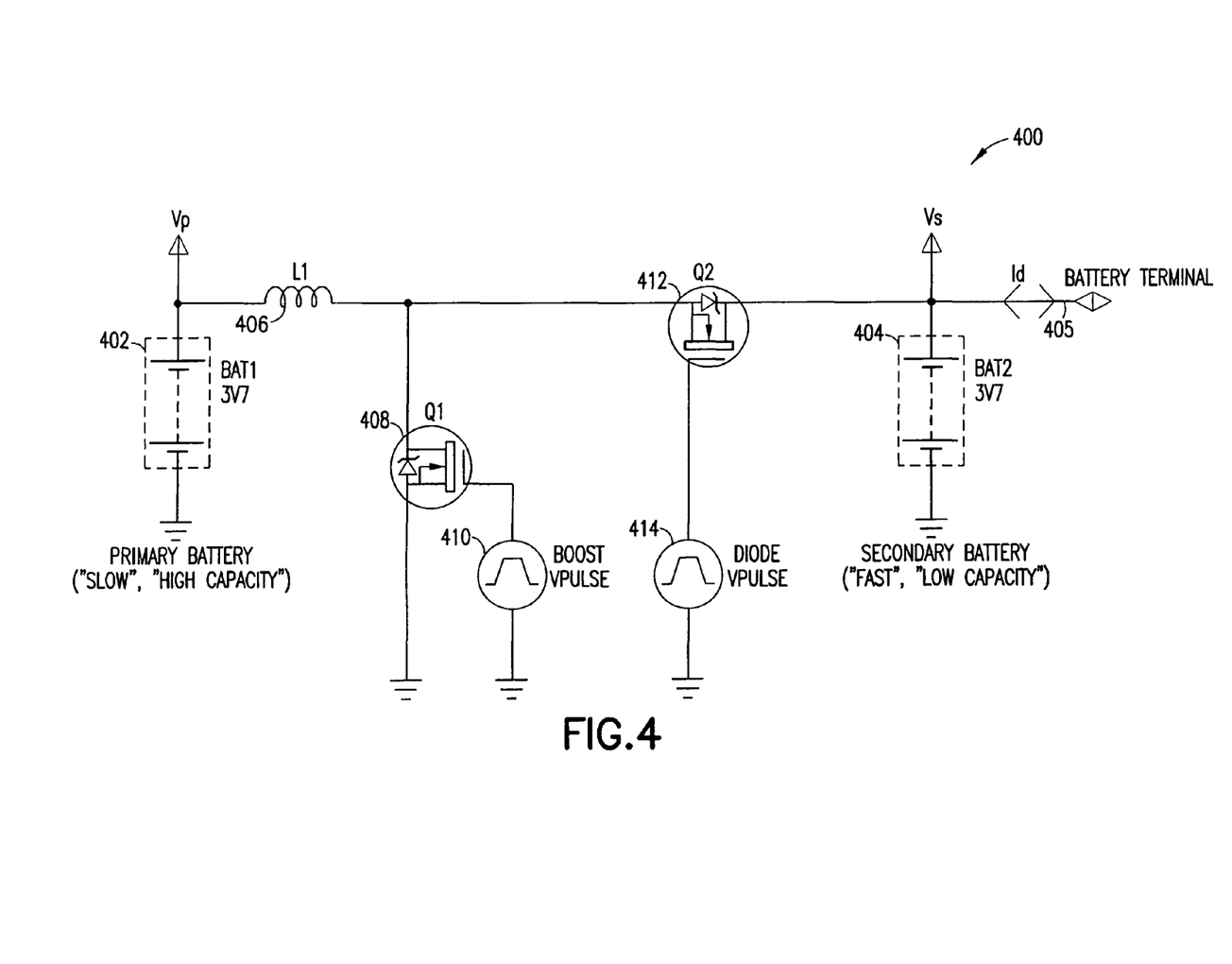

FIG. 4 illustrates a battery assembly 400 according to an embodiment of the present invention, illustrating electronic components that may be used to implement the assembly. The assembly 400 includes a first battery 402 and a second battery 404, connecting to a device through an interface 405. The connection between the first battery 402 and the second battery 404 takes the form of a reversible buck/boost converter, storing energy in an inductor 406, with current control being accomplished using a first transistor 408 controlled by a pulse diode 410, and a second transistor 412 controlled by a pulse diode 414.

Figure 5A:
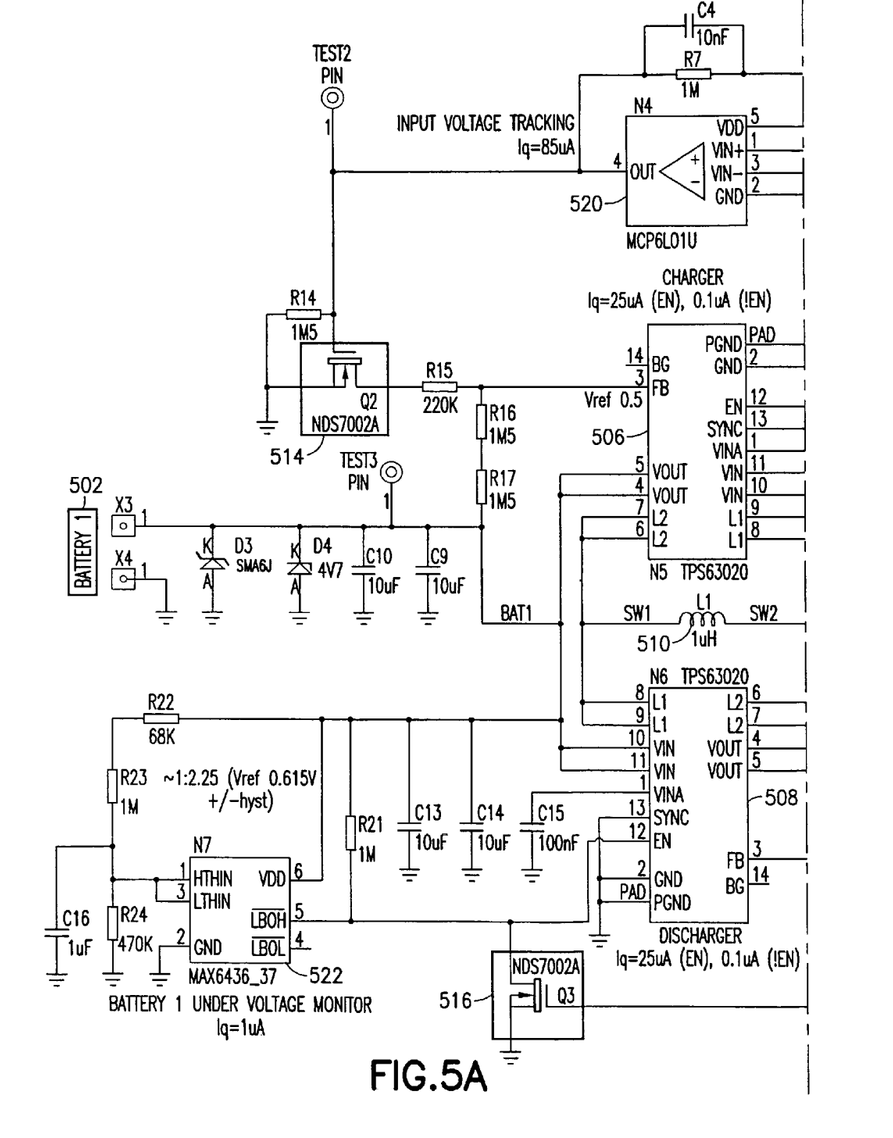
Figure 5B:
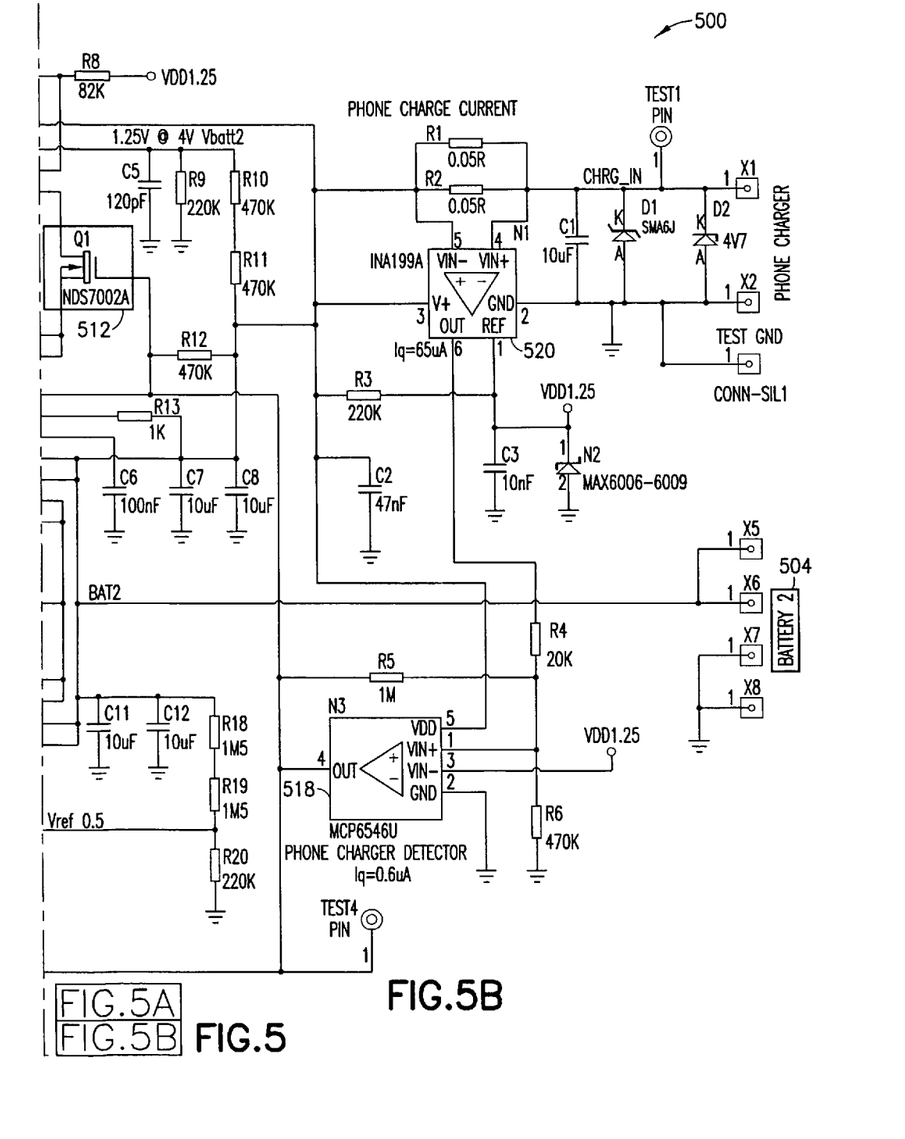

FIG. 5 illustrates a more detailed view of a battery assembly 500 according to an embodiment of the present invention. The battery assembly 500 may suitably be used in a mobile telephone, mobile device or other suitable device coupled or otherwise connected to a device charger or incorporating a device charger. The battery assembly 500 may also be placed in a separate charging station, for example, so that the battery assembly 500 may be charged separately from usage in a device. When the battery assembly 500 is placed in a device, the device draws charge from the battery assembly 500 when no charging current is provided. At other times, an incorporated or separate charger may provide current to charge the battery assembly—for example, when the device is connected to line current or placed in a charging receptacle, or which the battery assembly 500 is separately placed in a charging stand. A device charger may be a USB charger, a wireless charger, conventional AC adapter charger, or a solar charger, as examples.

The battery assembly 500 comprises a first battery 502 and a second battery 504, as well as a charger 506 and a discharger 508. The battery assembly provides switching to allow for the selection of current flow so that under different conditions, the assembly operates in one of a plurality of charge or discharge modes. Depending on the voltage levels of the batteries (which generally depend on charge levels), the first battery may supply the second while the second battery powers the device, the device may enter an idle state, or the device may enter a full power-off state. In the charge modes, the first battery, the second battery, or both, may be charged, depending on the voltage levels of the batteries, compared to one another or to thresholds.

Switching is performed by transistors 512, 514, and 516, with control of the transistors 512, 514, and 516 being provided by the sensing device 518, which senses the presence of a device charger, based on charge current delivered through a conditioner 518. The sensing device 522 performs input voltage tracking, and the sensing device 524 detects undervoltage of the first battery 502, so that the battery assembly 500 may continue or cease operation. If the first battery remains at a sufficient voltage level, the second battery 504 may provide power for the device, while the second battery 504 is charged, or its level is maintained, using power from the first battery 502, but if the first battery 502 can no longer maintain the sufficient voltage level, the assembly 500 may cause the device to enter an idle or power off mode.

Figure 6:
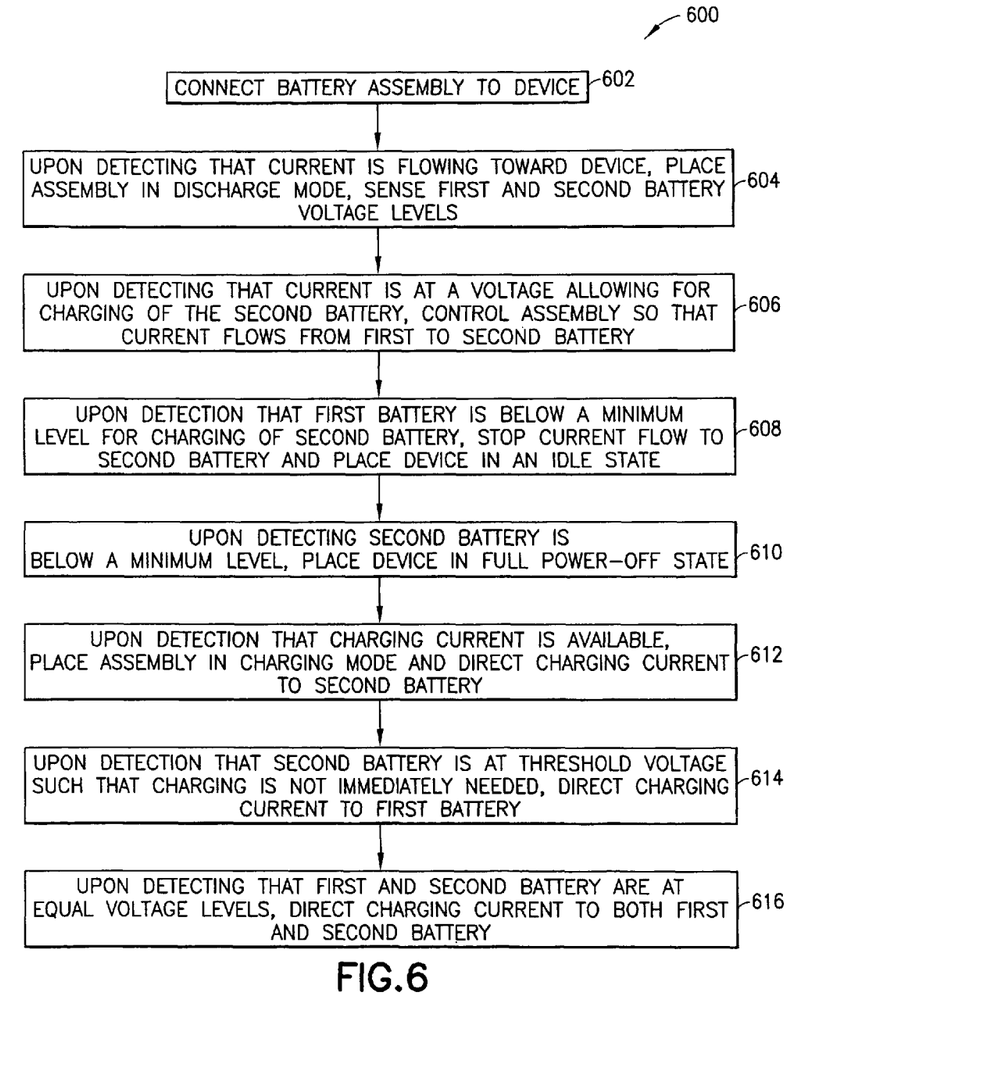
FIG. 6 illustrates a process according to an embodiment of the present invention.

FIG. 6 illustrates a process 600 of battery control according to an embodiment of the present invention. The process 600 may be used, for example, to manage use of a battery assembly comprising a high power battery and a high energy battery connected in parallel, with the high power battery supplying power to a device and the high energy battery providing charge for the high power battery. At step 602, an assembly comprising a high power battery and a high energy battery is connected to a device. At step 604, upon detection that current is flowing toward the device interface, connected in parallel, the assembly is placed in a discharge mode, and voltage levels of the first and the second battery are sensed. At step 606, upon detection that the first battery voltage is at a voltage allowing for charging of the second battery, the battery assembly is controlled so that current flows from the first battery to the second battery, with voltage adjustment between the first and second battery being accomplished by components of the assembly.

At step 608, upon detection that the first battery is below a minimum level, current flow to the second battery is stopped and the device is placed in an idle state. At step 610, upon detection that the second battery is below a minimum level, the device is placed in a full power-off state.

At step 612, upon detection that charging current is available, that is, upon detection that current is flowing from a device interface to the battery assembly, the battery assembly is placed in a charging mode and charging current is directed to the second battery. At step 614, upon detection that the second battery voltage is at a threshold voltage such that charging is not immediately needed, charging current is directed to the first battery. Charging may alternate between the first and the second battery as the voltage of the second battery rises above or falls below the threshold. At step 616, upon detection that the first battery and second battery voltages are equal, charging current is directed so as to charge both batteries simultaneously.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

We claim:

1. An apparatus, comprising:
a first battery interface;
a second battery interface connected in parallel to the first battery interface in a battery assembly; and
a current flow control mechanism for controlling current flow to at least one of the first battery interface and the second battery interface, comprising a single controller disposed between the first and second battery interfaces, wherein controlling current flow to and from the at least one of the first battery interface and the second battery interface is based at least in part on comparison between a voltage at the interface and a reference voltage value, wherein controlling the current flow comprises adjusting current flowing to the first battery interface so as to be compatible with a voltage profile exhibited at the first battery interface and adjusting current flowing to the second battery interface so as to be compatible with a voltage profile exhibited at the second battery interface.

2. The apparatus of claim 1, further comprising energy storage between the first battery interface and the second battery interface and wherein the at least one of the current flow control mechanism and the energy storage are configured to direct current flow from the first battery interface to the second battery interface.

3. The apparatus of claim 1, wherein controlling the current flow comprises directing current from the first battery interface to the second battery interface while current is flowing from the second battery interface to a device being powered by the battery assembly.

4. The apparatus of claim 1, wherein controlling the current flow comprises, upon detecting that current is being provided to the battery assembly, selecting at least one of the first battery interface and the second battery interface, wherein the selection is based on a comparison of a voltage level at the at least one of the first battery interface and the second battery interface against a reference.

5. The apparatus of claim 1, wherein controlling the current flow comprises directing current to the first battery interface if the voltage level at the second battery interface is at least equal to a stop voltage indicating that charging at the second battery interface may be suspended.

6. The apparatus of claim 5, wherein controlling the current flow comprises directing current to the second battery interface if the voltage level at the second battery interface is below the stop voltage.

7. The apparatus of claim 4, wherein controlling the current flow comprises directing current to both of the first battery interface and the second battery interface if the voltage level at the first battery interface equals the voltage level at the second battery interface.

8. The apparatus of claim 1, wherein the apparatus is incorporated into a mobile device.

9. A mobile device comprising:
a first battery interface;
an external power interface;
a second battery interface connected in parallel to the first battery interface in a battery assembly; and
a current flow control mechanism for controlling current flow to at least one of the first battery interface and the second battery interface, comprising a single controller disposed between the first and second battery interfaces, wherein controlling current flow to and from the at least one of the first battery interface and the second battery interface is based at least in part on comparison between a voltage at the interface and a reference voltage value, wherein controlling the current flow comprises adjusting current flowing to the first battery interface so as to be compatible with a voltage profile exhibited at the first battery interface and adjusting current flowing to the second battery interface so as to be compatible with a voltage profile exhibited at the second battery interface; and
a device charger connected to the battery assembly and an external power interface and directing current flow to at least one of the first battery interface and the second battery interface when the external power interface is connected to the external power source.

10. A method comprising:
for each of a first and a second battery interface connected in parallel in a battery assembly, comparing a battery voltage against a reference value; and
controlling current flow to and from each battery interface based on a comparison of a voltage and the reference value, using a single controller disposed between the first and second battery interfaces;
wherein controlling the current flow comprises adjusting the current flowing to the second battery interface so as to be compatible with a voltage profile exhibited at the first battery interface and adjusting the current flowing to the first battery interface so as to be compatible with a voltage profile exhibited at the second battery interface.

11. The method of claim 10, wherein controlling current flow comprises directing current flow from the first battery interface as directed by a current flow control mechanism and by energy storage between the first battery interface and the second battery interface.

12. The method of claim 10, wherein controlling the current flow comprises directing current from the first battery interface to the second battery interface while current is flowing from the second battery interface to a device being powered by the battery assembly.

13. The method of claim 10, wherein controlling the current flow comprises, upon detecting that current is being provided to the battery assembly, selecting at least one of the first battery interface and the second battery interface, wherein the selection is based on a comparison of a voltage level exhibited at the at least one of the first battery interface and the second battery interface against a reference.

14. The method of claim 13, wherein controlling the current flow comprises directing current to the first battery interface if the voltage level at the second battery interface is at least equal to a stop voltage indicating that charging at the second battery interface is allowed to be suspended.

15. The method of claim 14, wherein controlling the current flow comprises directing current to the second battery interface if the voltage level at the second battery interface is below the stop voltage.

16. The method of claim 13, wherein controlling the current flow comprises directing current to both of the first battery interface and the second battery interface if the voltage level at the first battery interface equals the voltage level at the second battery interface.

* * * * *